United States Patent [19]

Roman

[11] Patent Number: 5,049,025
[45] Date of Patent: Sep. 17, 1991

[54] AUTOMOBILE DOLLY

[76] Inventor: Andrew B. Roman, P.O. Box 475, Story, Wyo. 82842

[21] Appl. No.: 578,334

[22] Filed: Sep. 6, 1990

[51] Int. Cl.⁵ .............................................. B60P 3/00
[52] U.S. Cl. ................................... 414/429; 280/79.4
[58] Field of Search ................................ 414/426–429; 280/79.4, 47.34; 254/2 R, 2 B, 7 R, 7 B

[56] References Cited

U.S. PATENT DOCUMENTS

| | | | |
|---|---|---|---|
| 2,332,443 | 10/1943 | Foringer | 414/429 |
| 2,349,251 | 5/1944 | Domoj | 280/79.4 X |
| 2,357,633 | 9/1944 | Cowgill, Jr. | 414/427 |
| 2,380,415 | 7/1945 | Carruthers | 414/429 |
| 2,392,409 | 1/1946 | Ray | 414/429 |
| 2,491,034 | 12/1949 | Couch | 414/429 |
| 2,549,489 | 4/1961 | Krause | 414/427 |
| 2,565,869 | 8/1951 | Marschke | 414/429 |
| 2,806,615 | 9/1957 | Johnson | 414/429 |
| 2,812,086 | 11/1957 | Kuenzi | 414/429 |
| 4,692,082 | 9/1967 | Smith | 414/429 |
| 4,784,402 | 11/1988 | Roman | 280/79.4 |
| 4,976,449 | 12/1990 | Lotspeich et al. | 280/79.4 |

Primary Examiner—David A. Bucci
Attorney, Agent, or Firm—Berman, Aisenberg & Platt

[57] ABSTRACT

A dolly for an automobile comprises a first part which is U-shaped and includes a first side for engaging the tires of the automobile and casters. A second part is removably attached to the first part and provides a second side which can be pulled toward the first side to raise the automobile. The first and second parts are connected by threaded rods, and the two parts are pulled together by rotating nuts on the rods which also engage the first part of the dolly.

9 Claims, 3 Drawing Sheets

ID:5,049,025

AUTOMOBILE DOLLY

TECHNICAL FIELD

This invention relates to devices for moving automobiles around in a workshop.

BACKGROUND ART

In my prior U.S. Pat. No. 4,784,402, I disclosed a dolly for use in moving automobiles around in a workshop. That dolly comprises a frame made of angle iron which permits it to support either a tire of the automobile or a jack stand. When an automobile is supported on such a dolly, it can easily be pushed to a desired location in the workshop.

One problem, however, is that the automobile must be jacked up to be placed on the dolly. This is an inconvenience and complicates the process of loading the automobile on the dolly.

Devices are known in the art which provide a dolly in combination with a jacking mechanism.

U.S. Pat. No. 2,332,443 (Foringer) shows a jack for a cylindrical tank comprising a pair of spaced frames which are pulled together by oppositely threaded shafts. Each of the frames is supported by a caster and has rollers for engaging the sides of the tank as the frames are drawn together to raise the tank.

U.S. Pat. No. 2,349,251 (Domoj) shows a device for engaging and raising the axle of an airplane by moving together two dollies attached to an axle support.

U.S. Pat. No. 2,357,633 (Cowgill, Jr.) teaches an apparatus wherein two trucks are held by cables at a fixed distance on opposite sides of a wheel to be lifted. The wheel is lifted by hydraulically raising shoes in contact with the wheel.

U.S. Pat. No. 2,491,034 (Couch) shows a device for lifting the driving wheel of a railroad engine and includes two spaced tie rods for pulling two trucks together to engage and lift a wheel.

U.S. Pat. No. 2,549,489 (Krause) shows a wheel lifting dolly wherein the distance between two trucks is fixed, and one of the trucks has a hydraulic jack for urging a saddle against the wheel to be raised.

U.S Pat. No. 4,692,082 (Smith) shows a dolly for dual tires wherein two parallel legs of a U-shaped support are urged together to lift the tire.

SUMMARY OF THE INVENTION

The prior art does not provide a dolly capable of engaging both front or both rear tires of an automobile conveniently. Most of the prior art devices described above are designed for lifting a single wheel, and devices such as those taught by the Smith patent cannot easily be modified to extend across the width of an automobile.

In accordance with the invention, a dolly comprises a first, U-shaped part having casters and a first side element for engaging the front sides of the tires of an automobile. A second side element is attached to the first part after the first part is in place to engage the rear sides of the tires. Two threaded rods are attached to the first and second parts, and a nut is applied to the each of the rods. When the nuts are rotated, as by a wrench, the two parts are pulled together, and the two tires are raised. The same process is preferably followed for the other end of the automobile whereby both ends are placed on dollies. Thus, the automobile may easily be moved about the workshop.

The first and second side parts are preferably made of angle iron which provides horizontal and vertical surfaces. These surfaces allow the sides to engage either the tire of an automobile or a jack stand, as is explained in my earlier patent. The present construction has advantages over the earlier dolly. For example, the jack stand may be held tightly by the dolly by pulling the rear side toward the front to clamp the jack stand between the sides. Also, the distance between the sides can be adjusted to accommodate different sizes of jack stands. This ensures that the jack stand fits the dolly properly and will not tip over as the automobile is pushed around the shop. In addition, the provision of the removable second side eliminates the need for a separate jack if the automobile is to be supported by the tires and reduces the height by which the car need be raised to install it on jack stands.

DETAILED DESCRIPTION OF THE DRAWINGS

Figure 1:
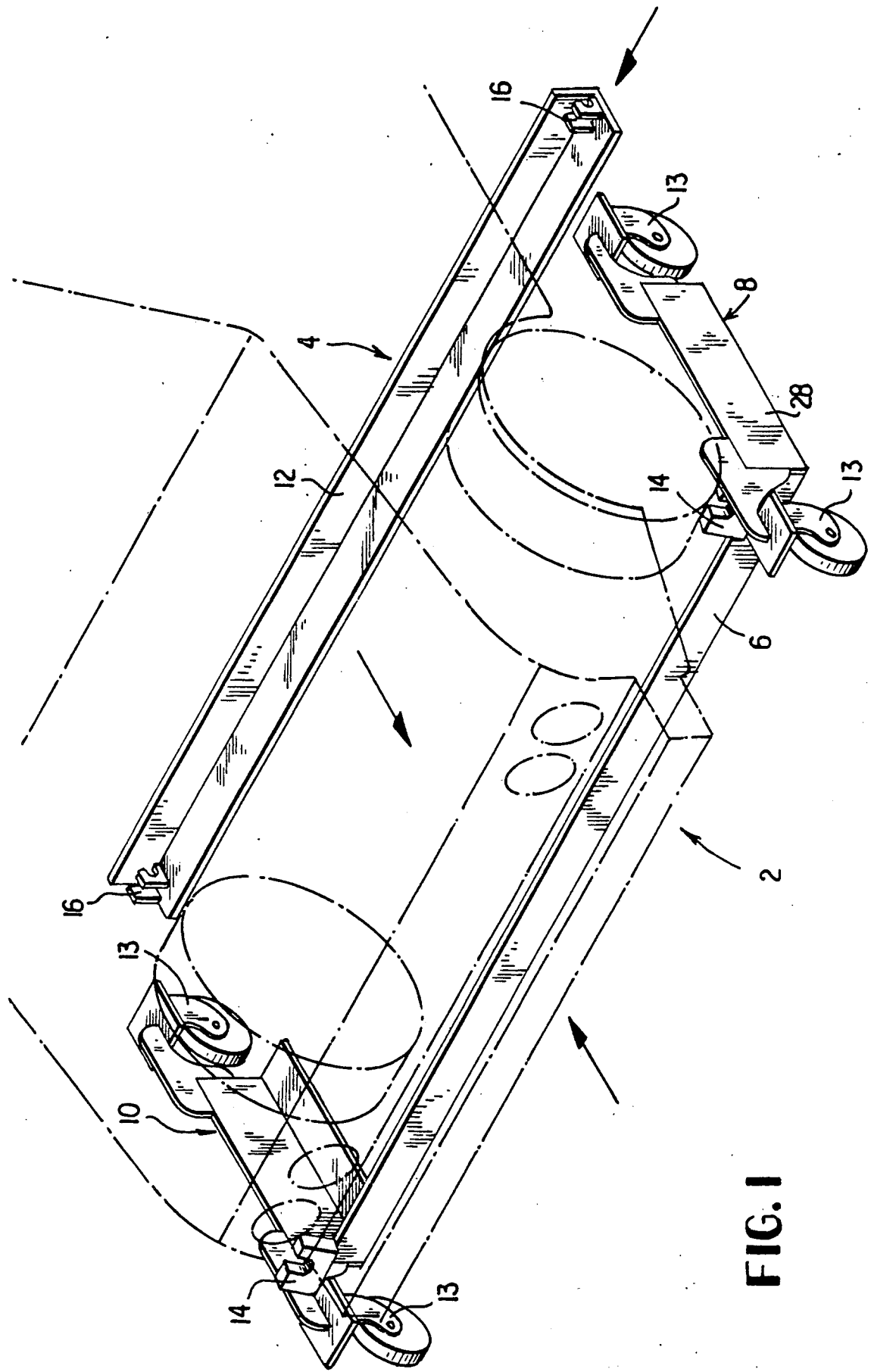
FIG. 1 is a perspective view of a disassembled dolly in accordance with the invention and showing an automobile in phantom lines.

With reference to FIG. 1, a dolly in accordance with the invention comprises a first part 2 and a second part 4. The first part 2 is generally U-shaped and includes a first side 6 which is preferably made of angle iron to provide vertical and horizontal surfaces. The first side is secured to a first end piece 8 and a second end piece 10, and each of the end pieces is provided with two casters 13. The first part is self supporting and capable of being moved about. In the preferred first step for use of the invention, the first part 2 is moved to the position with respect to an automobile shown in FIG. 1 wherein the first side 6 can be urged against the front sides of the tires of the automobile shown in phantom lines. Because the first part is wholly supported by the casters and is open along the long side, it is easily maneuvered into the position shown in FIG. 1

A second side 12 is also made of angle iron and is designed to engage the rear sides of the tires and to be received by the end pieces to support the tires of the automobile or one or more jack stands between the first and second sides. Because the second side is primarily a piece of angle iron, it is easily handled and slid behind the tires and attached to the first part.

Figure 2:
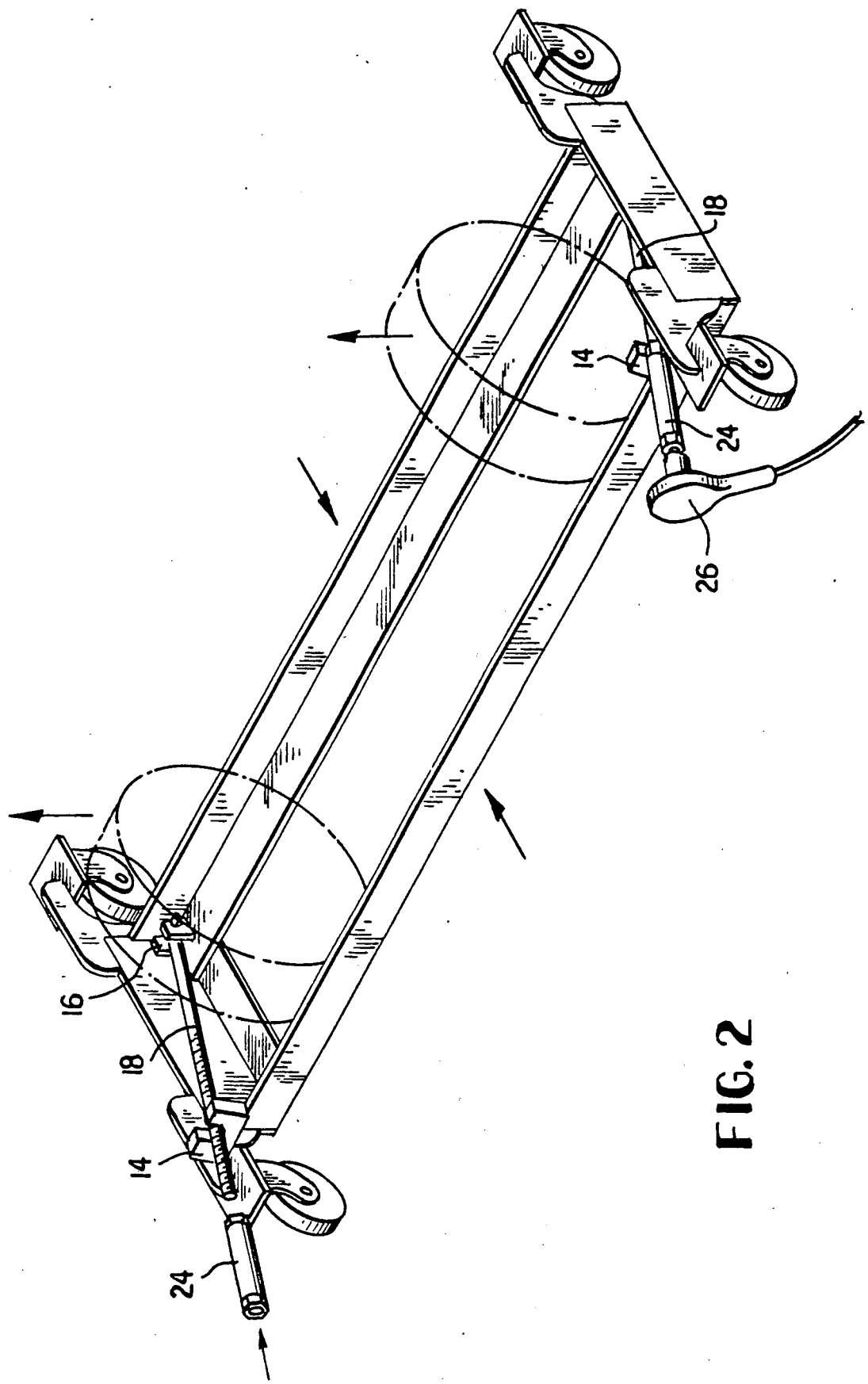
FIG. 2 is a perspective view of the dolly of FIG. 1 in an assembled condition and showing the wheels of the automobile in phantom lines.
Figure 3:
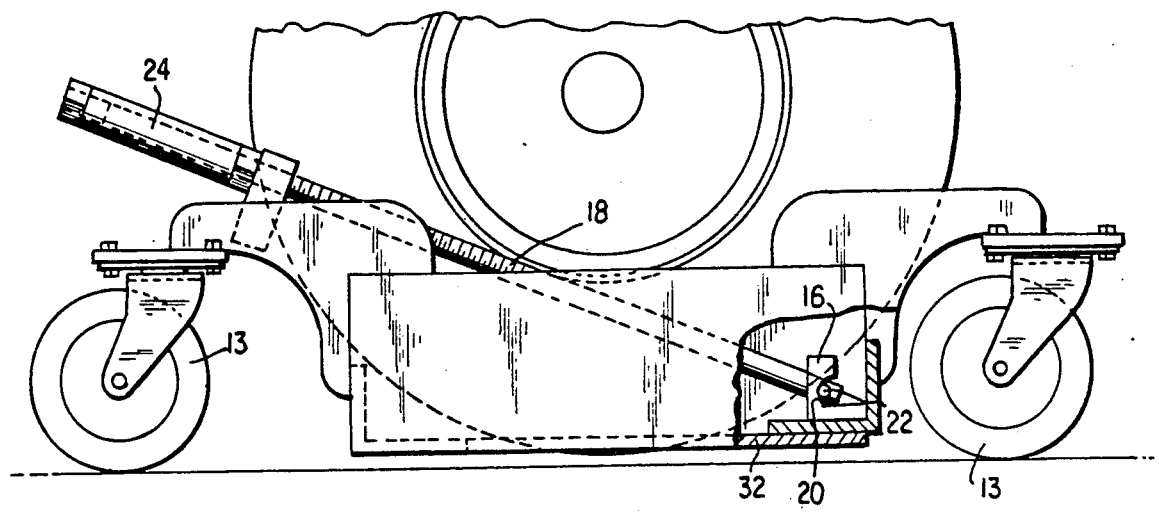
FIG. 3 is a side view of the dolly of FIG. 2 in partial cross section.
Figure 4:
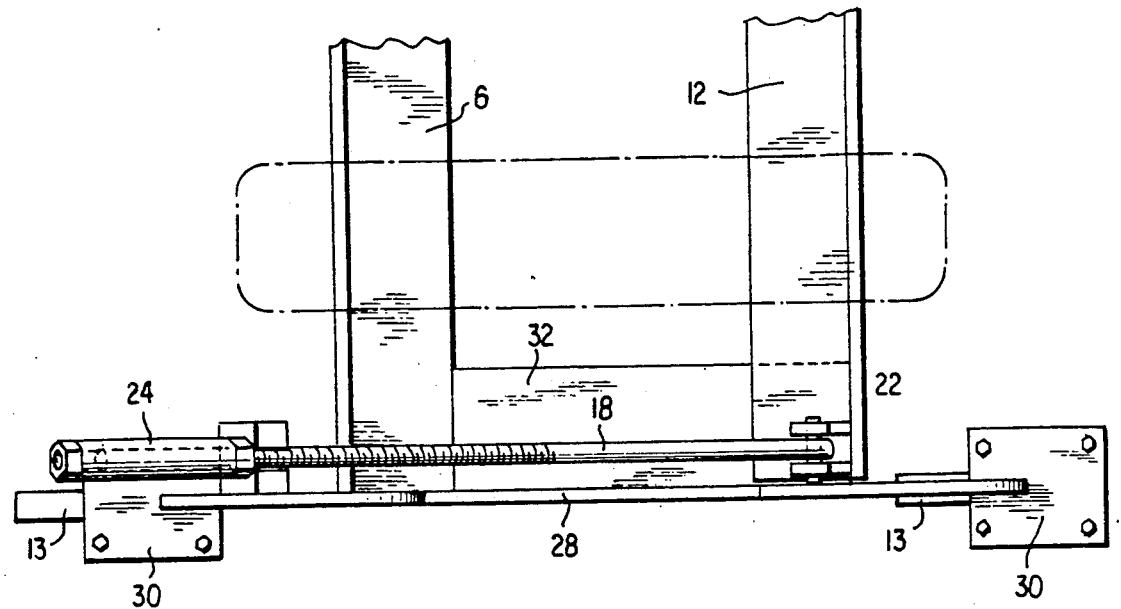
FIG. 4 is a partial top view of the dolly of FIG. 2.

The automobile may be raised by engaging front and rear parts of the tires by the first and second sides of the dolly and then pulling the first and second sides together. To accomplish this, the first side is provided with a pair of abutments 14, and the second side is provided with a pair of anchors 16. The abutments 14 and the anchors 16 removably receive a pair of rods 18 as shown in FIGS. 2 through 4. As shown more clearly in FIGS. 3 and 4, the anchors comprise two spaced plates with slots 20 therein. Each of the rods 18 includes a first end with a transverse pin 22 which engages the slots 20 when the rod is placed between the plates of the anchor.

The other ends of the rods are threaded to receive a nut 24. When the rod is received in the abutment 14, the nut 24 can be urged against the front surface of the abutment to exert a force which will draw the second side toward the first side. As illustrated in FIG. 2, a preferred method for rotating the nuts 24 is with a power wrench 26, such as an air or electric wrench commonly available in repair shops.

The threaded rods preferably extend from the lower surface of the second side to the top of the first side. This places the threaded ends of the rods in a location which provides easy access to the ends for attachment to the wrench 26. Also, some of the vertical load on the second side is carried by the threaded rod and the abutment. The outer face of the abutment is preferably tilted such that the face of the nut is square with the abutment and does not slip off.

Each of the end pieces 8 and 10 preferably includes a vertical plate 28 with mounting pads 30 for the casters 13. A horizontal plate 32 extends inwardly from the vertical plate 28 for supporting the first and second sides 6 and 12. The first side 6 is secured permanently to the horizontal plate, while the lower surface of the second side 12 rests on the horizontal plate and can slide on the plate as the second side is pulled toward the first side by the rods 18.

Because some of the vertical load on the second side is carried by the angularly oriented threaded rods, the horizontal surfaces 32 of the end pieces do not need to be made strong enough to support the entire load carried by the second side 12.

The construction of the end pieces can vary. In the embodiment shown, the vertical and horizontal surfaces 28 and 32 are parts of a piece of angle iron, and vertical plates for engaging the mounting pads 30 are welded to the angle iron pieces to complete the vertical plate 28. Alternatively, the vertical plate 28 may be unitary and the horizontal plate welded thereto.

The length of the horizontal surface 32 is such that the second piece can be rested on it while the ends of rods 18 are engaged with the anchors 16 and the abutments 14. The nuts 24 are then tightened to pull the first and second sides together to engage the tires and to lift the automobile as the sides are drawn together. In general, the nuts would be tightened to pull the second side toward the first side in such a manner that they remain parallel. It may be desireable in some instances, however, to pull one end of the second side closer toward the first side. For example, one end of the second side could be moved independently of the other to clamp or release a jack stand on that side of the dolly.

Because the second side is removable, it is also possible to provide a plurality of such second sides with different characteristics. Alternative second sides may include stops for engaging other types of supports or may include indicia to indicate the preferred placement of various tools designed for use with the dolly.

Other modifications within the scope of the appended claims will be apparent to those of skill in the art.

I claim:

1. A dolly for an automobile comprising a first part and a second part,
said first part comprising first and second opposed end pieces, a first side element for engaging a first side of a tire of an automobile and extending between said first and second end pieces, and wheel means for allowing said dolly and said automobile to be moved, and
said second part comprising a second side element separate from said first part and adapted to be removably attached to said first part opposite said first side element for engaging a second side of said tire and being supported entirely by said first part,
said dolly further comprising means for attaching said first side element to said second side element and for urging said first and second side elements toward each other.

2. A dolly according to claim 1 wherein each of said first and second side elements comprises substantially vertical and horizontal surfaces.

3. A dolly according to claim 2 wherein each of said end pieces includes a surface for supporting said second side element when said second side element is attached to said first part.

4. A dolly according to claim 3 wherein said means for attaching comprises first and second threaded rods, first and second nuts for engaging a respective one of said first and second threaded rods, and means for receiving said threaded rods and means for engaging said first and second nuts for applying a force to urge said first part toward said second part as said first and second nuts are rotated with respect to said threaded rods.

5. A dolly according to claim 4 wherein said wheel means are for engaging a generally planar floor surface and said threaded rods extend transverse to said floor surface.

6. A dolly according to claim 4 wherein each of said threaded rods includes a pin extending transverse to said rod and said means for receiving said threaded rods comprises two pair of plates, the plates of each pair being spaced by a distance at least equal to a diameter of a said threaded rod for allowing said pin to be engaged by said plates.

7. A dolly according to claim 6 wherein said means for engaging said first and second nuts comprises abutment means extending perpendicularly to said threaded rods.

8. A dolly for an automobile comprising a first part and a second part, said first part comprising first and second opposed end pieces, a first side element for engaging a first side of a tire of an automobile and extending between said first and second end pieces, and wheel means for allowing said dolly and said automobile to be moved, and said second part comprising a second side element separate from said first part and adapted to be removably attached to said first part opposite said first side element for engaging a second side of said tire, said dolly further comprising means for attaching said first side element to said second side element and for urging said first and second side elements toward each other, each of said first and second side elements comprising substantially vertical and horizontal surfaces, each of said end pieces including a surface for supporting said second side element when said second side element is attached to said first part, said means for attaching comprising first and second threaded rods, first and second nuts for engaging a respective one of said first and second threaded rods, and means for receiving said threaded rods and means for engaging said first and second nuts for applying a force to urge said first part toward said second part as said first and second nuts are rotated with respect to said threaded rods, and each of said threaded rods including a pin extending transverse to said rod and said means for receiving said threaded rods comprising two pair of plates, the plates of each pair being spaced by a distance at least equal to a diameter of a said threaded rod for allowing said pin to be engaged by said plates.

9. A dolly according to claim 8 wherein said means for engaging said first and second nuts comprises abutment means extending perpendicularly to said threaded rods.

* * * * *